April 3, 1934.　　　　　W. A. GIGER　　　　　1,953,401

ARTICULATED TRUCK FOR INDIVIDUAL AXLE DRIVE LOCOMOTIVES

Filed Nov. 23, 1929　　　3 Sheets-Sheet 1

INVENTOR
WALTER A. GIGER
BY Alfred N. Dyson
ATTORNEY

April 3, 1934.    W. A. GIGER    1,953,401
ARTICULATED TRUCK FOR INDIVIDUAL AXLE DRIVE LOCOMOTIVES
Filed Nov. 23, 1929    3 Sheets-Sheet 2

INVENTOR
WALTER A. GIGER
BY Alfred H. Dyson
ATTORNEY

April 3, 1934.  W. A. GIGER  1,953,401

ARTICULATED TRUCK FOR INDIVIDUAL AXLE DRIVE LOCOMOTIVES

Filed Nov. 23, 1929  3 Sheets-Sheet 3

INVENTOR
WALTER A. GIGER
BY Alfred H. Dyson
ATTORNEY

Patented Apr. 3, 1934

1,953,401

UNITED STATES PATENT OFFICE 1,953,401

ARTICULATED TRUCK FOR INDIVIDUAL-AXLE DRIVE LOCOMOTIVES

Walter A. Giger, Haddonfield, N. J., assignor, by mesne assignments, to Allis-Chalmers Manufacturing Company, Milwaukee, Wis., a corporation of Delaware Application November 23, 1929, Serial No. 409,207

10 Claims. (Cl. 105—175)

This invention relates to articulated trucks for the guiding of locomotives, and particularly to such trucks for the guiding of individual-axle drive electric locomotives.

Articulated trucks for the guiding of individual-axle drive electric locomotives are known which comprise a truck frame, a guide axle and one of the driving axles of the locomotive, the truck frame being pivoted to the locomotive frame at a point adjacent the driving axle. Said driving axle is supported in the truck frame and is, therefore, capable of radial movement with respect to the locomotive frame. A driving motor mounted on the locomotive frame actuates said driving axle by means of a flexible coupling which transmits the torque of the motor to the driving axle while permitting the necessary radial movement thereof with respect to the locomotive frame.

It has been found in certain cases that said articulated truck, comprising a radially movable driving axle having a pair of driving wheels and a single guiding axle having a pair of guiding wheels, is not adequate for all conditions of locomotive operation. For example, in the case of heavy, high-power and high-speed locomotives in which a considerable locomotive weight must be supported by the guide-axle, the axle being subjected, at the same time, to the stresses incident to guiding the locomotive, the load on the guiding axle becomes excessive, such excessive loading causing undue wear of locomotive running parts and track and being accompanied by risk of wheel or axle breakage and risk of locomotive derailment.

It is the general object of the present invention, therefore, to provide an improved articulated truck for individual-axle drive electric locomotives.

A further object of the invention is to provide articulated truck means, for individual-axle drive electric locomotives and comprising a driving axle radially movable with respect to the locomotive frame and to the driving motor for said driving axle, whereby that part of the locomotive weight which is supported by guide axles is distributed over such a number of said guide axles that excessive loads thereon are avoided.

A further object is to provide, in an individual-axle drive electric locomotive of relatively long wheel base, great weight and high speed, an articulated truck such that wear of locomotive parts and track is reduced, and risk of wheel or axle breakage or of derailment, particularly in event of the locomotive taking curves at high speed, is minimized.

In carrying my invention into effect, I provide, in an individual-axle drive electric locomotive having an articulated truck having a driving axle journaled therein and driven by a motor mounted on the locomotive frame, a plurality of guide axles for said truck, the plurality of axles being arranged to assume a radial position relative to the articulated truck frame connecting the guide axles and the driving axle.

Further objects and advantages of my invention will be apparent, and a clearer understanding thereof may be had from the following description thereof and the accompanying drawings in which, Figure 1 is a diagrammatic view of an individual-axle drive electric locomotive embodying the present invention;

Figure 1:
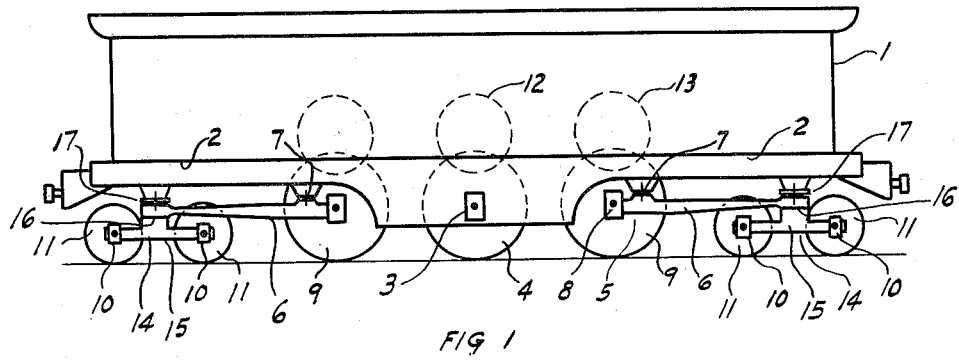
Figure 2:
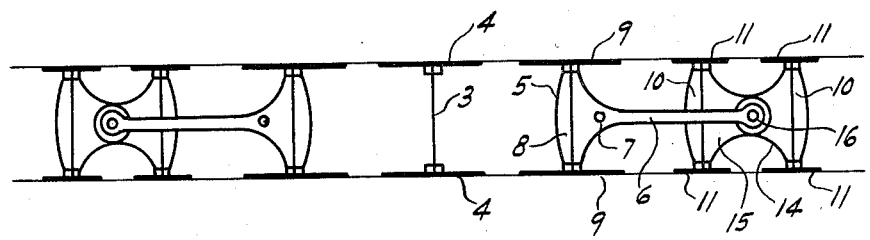
Figs. 2 and 3 are diagrammatic plan views illustrating certain running parts of the locomotive shown in Fig. 1, when the locomotive is on tangent track and when taking a curve, respectively.
Figure 3:
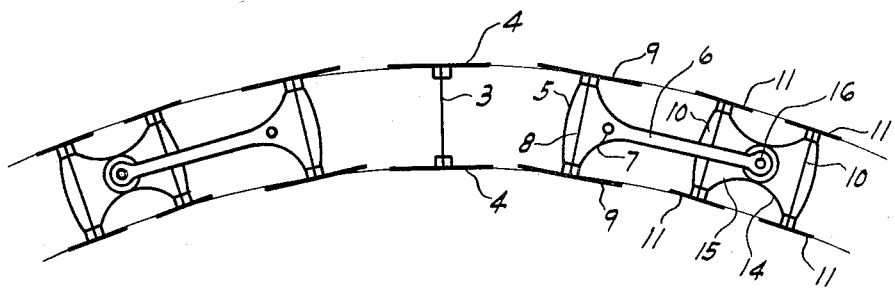

Referring to Figs. 1 to 3 of the drawings, an individual-axle drive electric locomotive 1 is provided with under frame or locomotive frame 2, driving axle 3 supported in frame 2 and secured against radial movement with respect thereto, and driving wheels 4 secured to axle 3.

The locomotive is further provided with two articulated trucks 5, each comprising an articulated-truck fame 6 pivoted to the locomotive frame by a main center-pin 7 at a point preferably closely adjacent driving axle 8, said axle 8 being journaled in said articulated-truck frame at one extremity thereof, driving wheels 9 secured to axle 8, and guiding axles 10, each of said guiding axles having a pair of guide wheels 11 secured thereto. The relation of the guiding axles 10 to the truck frame 6 will be explained more fully hereinafter.

Driving axle 3 is driven in any suitable manner as by motor 12 mounted on the locomotive frame. Driving axle 3 may be provided with means for lateral clearance, or wheels 4 may be without flanges. Driving axles 8, which are comprised in the articulated trucks 5, are individually driven by motors 13 in accordance with a well-known system wherein said motors are mounted rigidly on locomotive frame 2, the torque of the motors being transmitted to wheels 9 and to axles 8 secured thereto through a flexible coupling, whereby axles 8, which are journaled in articulated truck frames 6, may swing about the center pin 7 and assume a radial position with respect to the locomotive frame on which the motors are mounted.

Prior articulated trucks for individual-axle drive electric locomotives and comprising a truck frame as 6 and a driving axle as 8 journaled therein, incorporate only a single guide axle for a given articulated truck, said single guide axle being journaled in the extremity of the truck frame opposite to that in which the driving axle is journaled.

In accordance with my invention, I provide, instead of said single guide axle, a guide truck 14 having a plurality of guide axles, for example, two guide axles 10. Further, in accordance with my invention, said two guide axles 10 are journaled in a guide truck frame 15 at opposite extremities thereof, said frame being pivoted by guide truck center-pin 16, as at a point midway of the guide axles, to the articulated-truck frame 6 adjacent the extremity thereof opposite to that extremity adjacent which driving axle 8 is journaled.

The articulated truck 5 is preferably equipped with a centering device, which may be of well-known form and located adjacent guiding member 17 of truck frame 6, to prevent oscillation of the locomotive between the rails when running on tangent track, and further, to provide a centering force of predetermined amount when running through a curve.

In operation of the locomotive, when running on tangent track as shown in Figs. 1 and 2, driving wheels 9, are maintained in alignment with the track by the four-wheel guide truck 14. When the locomotive is running through a curve, as shown in Fig. 3, driving axles 8 journaled in the articulated truck 5, are forced by the guide truck 14 to swing about the center pin 7 and assume a radial position with respect to the locomotive frame, the articulated-truck frame 6 rotating on main center-pin 7 and the guide truck frame 15 rotating on guide truck center-pin 16.

Figure 4:
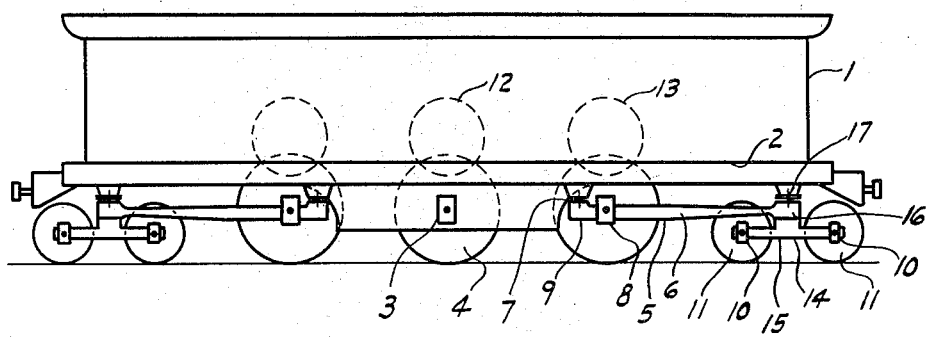
Figs. 4, 5 and 6 are similar to Figs. 1 to 3, respectively, and illustrate a modified form of connection of the articulated truck to the locomotive frame.
Figure 5:
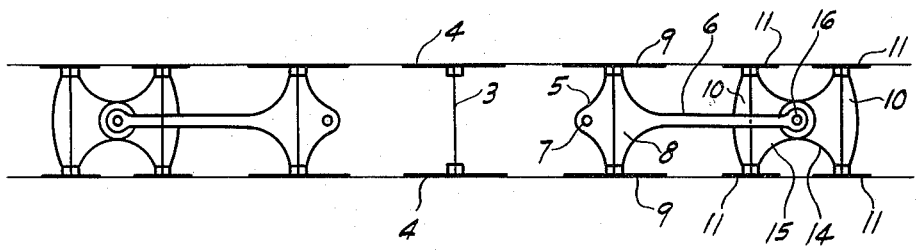
Figure 6:
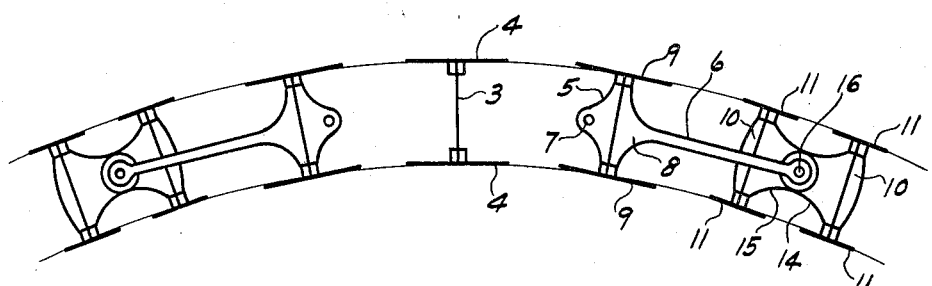

Figs. 4 to 6 of the drawings illustrate an embodiment of the invention similar to that of Figs. 1 to 3. In the embodiment illustrated in Figs. 1 to 3, however, main center-pin 7 of articulated-truck frame 6 is located between driving axle 8 and truck center-pin 16, while in the embodiment illustrated in Figs. 4 to 6, the main center-pin 7 is located in frame 6 at a point on the opposite side of axle 8 from guide truck center-pin 16.

The operation of the locomotive having the articulated truck pivoted in accordance with the embodiment of the invention shown in Figs. 4 to 6, is essentially the same as that hereinbefore described in connection with Figs. 1 to 3.

Figure 7:
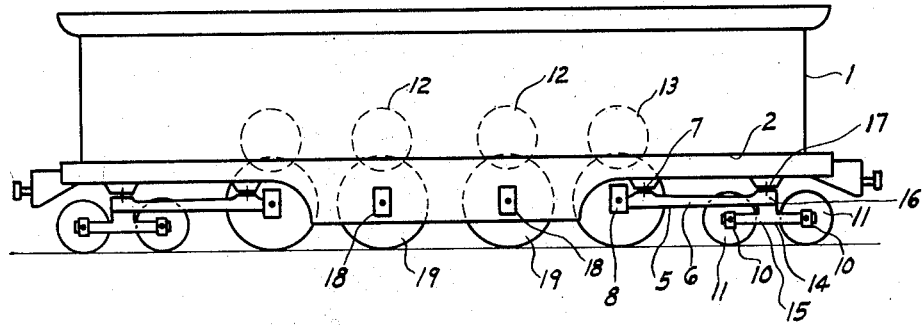
Figs. 7, 8 and 9 illustrate an electric locomotive having the articulated truck shown in Figs. 1 to 3, but comprising a larger number of driving axles.
Figure 8:
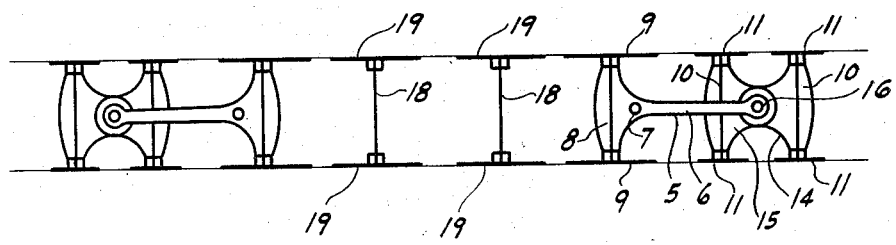
Figure 9:
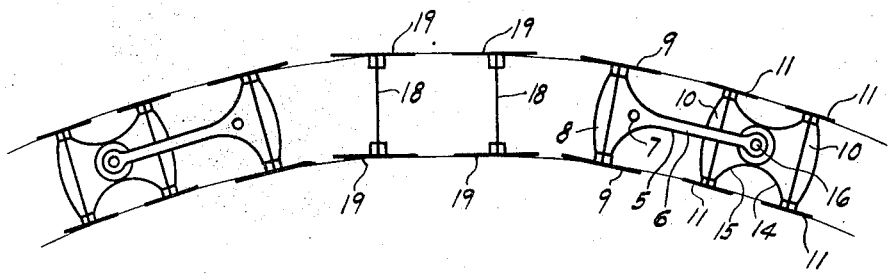

Figs. 7 to 9 of the drawings illustrate an embodiment of the invention similar to that shown in Figs. 1 to 3, but differing therefrom in that four driving axles are incorporated therein, two of which, 18, are, like driving axle 3 of Figs. 1 to 3, radially immovable with respect to the locomotive frame and are individually driven by motors 12 mounted thereon. Axles 18 are preferably provided with means for lateral clearance, or wheels 19 may be without flanges in order to permit the locomotive to run through curves without excessive pressures on the track. Main center-pin 7 is located between driving axle 8 and truck center-pin 16, as shown in Figs. 1 to 3, but said main center-pin may be located on the opposite side of driving axle 8 from center-pin 16, as shown in Figs. 4 to 6.

Operation of the locomotive which comprises the four driving axles, as shown in Figs. 7 to 9, and which may be of the heavy, high-power and high-speed type, is similar to that described in connection with Figs. 1 to 6. It will be noted that when the locomotive illustrated in Figs. 7 to 9 is running through a curve, six-wheel trucks 5, comprising driving wheels 9 and guide truck wheels 11, provide a highly efficient and preferably the only aligning and guiding means for said locomotive, the mounting of the four central driving wheels 19, which carry a large part of the locomotive weight, being preferably such as to provide lateral clearance, or said wheels being without flanges, the four central driving wheels, therefore, taking no part in guiding the locomotive.

It will be evident, particularly from Figs. 3, 6 and 9, that the provision of the four-wheel guide truck 14, the same being pivoted at center-pin 16 and, therefore, rotatable with respect to articulated-truck frame 6 joining said truck 14 to the driving wheels 9, ensures an improved guiding effect from said guide wheels as compared with the guiding effect obtainable when a single guide axle is rigidly journaled to the extremity of the articulated-truck frame. Since wheels 11 of guide truck 14 are self-aligning with reference to the track, by reason of the fact that said guide truck is pivoted to frame member 6, which is itself pivoted to the locomotive frame, therefore, when the locomotive is running through a curve, the angle at which the flanges of guide wheels 11 strike the track is reduced to a value negligibly small as compared with the striking angle of the wheel flange in the single guide wheel system hereinbefore cited.

It will be noted that I distribute that portion of the locomotive weight which is supported by guide axles, over at least two guide axles and four guide wheels for each articulated truck, and that wear of locomotive parts and track and risk of breakage or derailment, due to overloading of guide axles, are, therefore, minimized, while, at the same time, the guiding action of the guide wheels, for example, when the locomotive is running through curves, is not thereby rendered less effective. On the contrary, the effectiveness of said guiding action is markedly increased by reason of the freely rotatable mounting of the guide truck unit 14 comprising guide truck frame 15 and the four guide wheels 11 journaled therein.

Various embodiments of my invention have been described herein for the purpose of illustration. It will be understood, however, that modifications in the structure disclosed may be made without departing from the scope of the invention as defined in the appended claims.

The invention claimed is:

1. In a locomotive having a frame supported on a plurality of driving axles, the combination with an articulated truck frame having one of said driving axles journaled therein, said truck frame being pivotally connected to said locomotive frame to permit positioning of said one of said driving axles radially with respect to the position of other of said axles, of a plurality of guide axles pivotally connected to said truck frame to effect said positioning of said one of said axles.

2. In a locomotive having a frame supported on a plurality of driving axles, the combination with an articulated truck frame having one of said driving axles journaled therein, said truck frame being pivotally connected at a point thereof adjacent said axle to said locomotive frame, of a plurality of guide axles pivotally connected to said truck frame to cause positioning of said one of said axles radially relative to the position of other of said axles.

3. In a locomotive having a frame supported on a plurality of driving axles, the combination with an articulated truck frame having one of said driving axles journaled therein, said truck frame being pivotally connected to said locomotive frame to permit radial positioning of said one of said driving axles with respect to the position of other of said axles, of a guide truck pivotally connected to said articulated truck frame whereby said one of said axles is caused to swing about the said pivotal connection of said articulated truck with said locomotive frame to assume a radial position with respect to the position of other of said axles.

4. In a locomotive having a frame supported on a plurality of driving axles, the combination with an articulated truck frame having one of said driving axles journaled therein adjacent one extremity thereof, said truck frame being pivotally connected at a point thereof adjacent said one of said axles to said locomotive frame, of a guide truck pivotally connected to said articulated truck frame adjacent the extremity thereof opposite the extremity adjacent which said one of said axles is journaled to cause said one of said axles to swing about the pivotal connection of said articulated truck frame with said locomotive frame and thereby assume a radial position relative to the position of other of said axles.

5. In an electric locomotive supported on a plurality of driving axles, the combination with a locomotive frame, a driving motor mounted thereon and an articulated truck frame having one of said driving axles journaled therein, said one of said axles being driven by said motor, said truck frame being pivotally connected to said locomotive frame to permit radial positioning of said one of said driving axles with respect to the position of other of said axles, of a plurality of guide axles pivotally connected to said truck frame to effect radial positioning of the said one of said axles.

6. In an electric locomotive, the combination with a locomotive frame supported on a plurality of driving axles, a driving motor mounted on said frame, and an articulated truck frame having one of said driving axles journaled therein, said one of said axles being driven by said motor, said truck frame being pivotally connected at a point thereof adjacent said axle to said locomotive frame, of a plurality of guide axles connected to said truck frame to effect positioning of said one of said axles radially with respect to the position of other of said axles.

7. In an electric locomotive, the combination with a locomotive frame supported on a plurality of driving axles, a driving motor mounted on said frame, and an articulated truck frame having one of said driving axles journaled therein, said one of said axles being driven by said motor, said truck frame being pivotally connected to said locomotive frame to permit radial positioning of said one of said driving axles with respect to the position of other of said axles, of a guide truck pivotally connected to said articulated truck frame operative to cause said one of said axles to swing about said pivotal connection and thereby assume a radial position relative to the position of other of said axles.

8. In an electric locomotive, the combination with a locomotive frame supported on a plurality of driving axles, a driving motor mounted on said frame, and an articulated truck frame having one of said driving axles journaled therein adjacent one extremity thereof, said one of said axles being driven by said motor, said truck frame being pivotally connected at a point thereof adjacent said one of said axles to said locomotive frame, of a guide truck pivotally connected to said articulated truck frame adjacent the extremity thereof opposite the extremity adjacent which said one of said axles is journaled operative to cause said one of said axles to swing about the pivotal connection of said articulated truck frame with said locomotive frame and thereby assume a radial position with respect to the position of other of said axles.

9. In an electric locomotive, the combination with a locomotive frame, a driving axle journaled therein, an articulated truck frame having a driving axle journaled therein adjacent one extremity thereof, a motor mounted on said locomotive frame for driving the second said driving axle, said truck frame being pivotally connected at a point thereof adjacent the second said driving axle to said locomotive frame, of a guide truck pivotally connected to said articulated truck frame adjacent the extremity thereof opposite the extremity adjacent which the second said axle is journaled operable to cause the second said axle to assume a radial position relative to the position of the first said axle.

10. In an electric locomotive, the combination with a locomotive frame having a plurality of driving motors mounted therein, a driving axle journaled in said frame and driven by one of said motors, of an articulated truck comprising a truck frame having a driving axle journaled therein adjacent one extremity thereof, the second said driving axle being driven by another of said motors, said truck frame being pivotally connected at a point thereof adjacent the second said driving axle to said locomotive frame, said articulated truck comprising a guide truck pivotally connected thereto adjacent the extremity thereof opposite the extremity adjacent which said driving axle is journaled operable to cause the second said axle to assume a radial position relative to the position of the first said axle.

WALTER A. GIGER.